United States Patent Office 3,597,244
Patented Aug. 3, 1971

3,597,244
WATER-FAST INKS AND METHOD FOR MAKING SAME
Abraham Fookson, Silver Spring, Md., and Henry Peper, Pacific Palisades, and Daniel W. Seregely, Los Angeles, Calif., assignors to The Gillette Company, Boston, Mass.
No Drawing. Continuation of application Ser. No. 719,833, Apr. 9, 1968. This application June 19, 1970, Ser. No. 48,933
Int. Cl. C09d 11/00
U.S. Cl. 106—22
2 Claims

ABSTRACT OF THE DISCLOSURE

A water-fast ink solution for use in ballpoint pens, said solution containing a water-insoluble resin in a solvent therefor and a water-insoluble dye salt which is formed in situ by the reaction of a sulfonic acid dye with a basic dye and/or an acid salt of a basic dye, the acid being either a mineral acid or a carboxylic acid. A method for producing such a water-fast ink solution for ballpoint pens which comprises dissolving a water-insoluble resin in a solvent therefor and dissolving a sulfonic acid dye, at least one basic dye, and, optionally, an acid in the resulting solution and heating and stirring the mixture. If the acid is present, there is formed an acid salt of the basic dye which subsequently reacts with the sulfonic acid dye to form a water-insoluble dye, said water-insoluble dye being soluble in the resin solvent and preferably also in the resin when in the molten state. In the alternative, the acid salt of the basic dye can be added directly to the resin solution in conjunction with the sulfonic acid dye rather than adding an acid and a basic dye separately.

---

This application is a continuation of copending application Ser. No. 719,833, filed Apr. 9, 1968, now abandoned.

BACKGROUND OF THE INVENTION

Pens utilizing a hard ball as the writing nib, have, in recent years, surpassed ordinary pens in popularity. Because of certain mechanical structural features of the ballpoint pen, there are certain problems in developing inks for use in such pens and the inks utilized in these pens must have different properties than inks utilized in ordinary fountain pens. Among other problems, there has been some difficulty in developing an ink for use in a ballpoint pen which is water-insoluble and still possesses the other characteristics necessary for a satisfactory ballpoint pen ink.

Ballpoint pen inks composed of a water-insoluble dye dissolved in a suitable solvent are not completely satisfactory because the water-insoluble dye tends to precipitate out to some extent, or in the alternative, does not go completely in solution, and therefore the ink contains small particles. This is a serious disadvantage because the clearance between the ball and the socket varies anywhere from one to five microns depending upon the style of the pen and the viscosity of the ink used. Small particles floating in the ink clog the space between the ball and the socket and the ink will no longer flow freely.

In addition, an ink for ballpoint pens must be sufficiently viscous so that the ink will not seep past the ball. Generally speaking, the viscosity of the ballpoint pen ink should be between 8,000 and 25,000 centipoises and, preferably, between 12,000 and 20,000 centipoises. This viscosity in a number of inks is obtained by the use of expensive viscosity building dyes which make the cost of the ballpoint pen ink almost prohibitively high.

SUMMARY OF THE INVENTION

The present invention is based upon the surprising discovery that water-fast ink solutions for use in ballpoint pens can be produced at a relatively low cost by minimizing the amount of viscosity building dyes utilized in such compositions. Moreover, the water-fast ink solutions of this invention are stable for extended periods of time even when exposed to ambient conditions and temperatures.

The exceptional and surprising characteristics of the water-fast ink compositions of this invention are obtained by forming a water-insoluble dye salt in the ink compositions in situ in the presence of a water-insoluble resin. The water-insoluble dye salt is the reaction product of a sulfonic acid dye with a basic dye and/or an acid salt of a basic dye. The amount of resin in the ink composition is sufficient to raise the viscosity of the ink composition to between 8,000 and 25,000 centipoises (preferably between 12,000 and 20,000 centipoises).

It is thus an object of the present invention to embody and produce a water-fast ink solution for use in ballpoint pens.

Another object of this invention is to disclose and provide a water-fast ink solution for ballpoint pens which will not clog the pen and which will give an even writing even after standing for a long period of time and after being exposed to ambient conditions.

A further object of the present invention is to disclose and embody a water-fast ink solution which has a viscosity of from 8,000 to 25,000 centipoises and is relatively inexpensive.

It is still a further object of the invention to provide a water-fast ink solution for ballpoint pens which contains a water-insoluble dye which has been produced in situ in the presence of a water-insoluble resin, said dye being the reaction product of a sulfonic acid dye with a basic dye and/or an acid salt of a basic dye.

DESCRIPTION OF THE PREFERRED EMBODIMENTS

The water-fast ink solutions of this invention contain as essential ingredients (1) a water-insoluble resin (2) a water-insoluble dye which is formed in situ by the reaction of a sulfonic acid dye with (a) at least one basic dye and/or (b) at least one acid salt (preferably the acid is either a mineral acid or a carboxylic acid) of a basic dye and (3) a solvent for the water-insoluble resin, the water-insoluble dye which is formed in situ, the sulfonic acid dye and the basic dye or the acid salt of the basic dye.

The amount of water-insoluble resin should be sufficient to raise the viscosity of the ink solution to between 8,000 and 25,000 centipoises; preferably between 12,000 and 20,000 centipoises. The precise amount of resin necessary to obtain the requisite viscosity depends upon a number of factors such as the particular resin being utilized, the particular solvent or solvents and the type of dyes utilized in forming the water-insoluble dye salt. The precise amount of resin necessary to form the most desirable viscosity can easily be determined by routine experiments. Generally speaking, the amount of resin utilized is from 15% to 25% by weight, based on the entire weight of the ink solution.

Similarly the amount of solvent utilized in the ink compositions of this invention depend upon the particular solubility of the water-insoluble resin and the dye utilized. It is necessary to use a sufficient amount of solvent so that both the water-insoluble resin and the dyes are soluble therein. Experiments have shown that for most resins, dyes and solvents, the amount of solvent should be between 35% and 50% or even as high as 60% based on the weight of the entire ink composition.

The amount of water-insoluble dye which is formed in situ is dependent upon the particular type of dye formed, e.g. its color intensity and its solubility in the solvents being utilized. Generally speaking, the amount of water-insoluble dye can range anywhere from 20% by weight to as high as 50% by weight. However, it should again be emphasized, that the precise amount of water-insoluble dye is that amount which will give the ink solution a sufficient color strength to produce a satisfactory writing. This precise amount can be determined easily by those skilled in the art by utilizing the information contained in the instant specification.

The amount of sulfonic acid dye and the basic dye or the basic dye acid salt should be stoichiometric; however, the sulfonic acid dye can be present in excess over the ideal stoichiometric amount. The particular amount of each of the dye reactants, i.e. the sulfonic acid dye, the basic dye and the basic acid dye salt, should be sufficient to form a water insoluble acid dye salt which will give the ink solution a sufficient color strength to produce a satisfactory writing. For the most part, a satisfactory ink solution will result if the sulfonic acid dye comprises, before reacting, about 15% to 25% by weight of the entire composition.

Any sulfonic acid dye or salt of a sulfonic acid dye can be utilized in the present invention. Sulfonic acid dyes and salts thereof are well known in the art and the present invention is not predicated upon such dyes. Among sulfonic acid dyes which may be mentioned that are usable in the present invention are sulfonated anthraquinone dyes such as Du Pont Anthraquinone Blue 3G (C. I. Acid Blue 145) and Calcocid Alizarine Blue SAPG (C. I. Acid Blue 45). In addition, sulfonated disazo dyes can be utilized, e.g. Pontamine Sky Blue 6 BX (C. I. Direct Blue 1) and Luxol Fast Blue ARN (C. I. Solvent Blue 37). Sulfonated monoazo dyes such as Pontacyl Violet or BSN (Acid Violet 3) may also be mentioned. Sulfonated triphenyl methane dyes such as Alphazurine FGND (C. I. Acid Blue 9) and Wool Violet 4 BN (C. I. Acid Violet 17) have been found to be useful as one of the reactants in forming the water-insoluble dye salts.

Particularly useful are salts of sulfonic acid dyes such as those formed by reacting a sulfonic acid dye with guanidine and aryl guanidine. Samples of such dyes are Luxol Blue MBSN which is a sulfonated phthalocyanine dye which has been reacted with di-ortho tolyl guanidine and a disazo dyestuff (C. I. Acid Red 191) which has been reacted with di-xylyl guanidine.

It should be particularly emphasized that when the salt of a sulfonic acid is reacted with either a basic dye or the salt of a basic dye, the salt of the sulfonic acid and/or the salt of the basic dye splits off from the respective dyes and only the basic dye and the sulfonic acid dye form a part of the water-insoluble dye salt; the salts being soluble in the ink composition.

Water-insoluble resins which are useful in the present invention have generally the following characteristics: a melting or softening point of between 70° C. and 175° C., a molecular weight of between 500 and 4,000 and an acid number of between 0 and 200. In addition, the resin must be soluble in the particular ink solvents utilized; examples of such solvents being glycols and glycol ethers. Examples of resins having the above characteristics and useful in this invention are vinyl polymers such as Polyol X 450 which is a copolymer of styrene and allyl alcohol and PVP K–30 which is poly (vinyl pyrrolidone). In addition alkyd resins such as Phthalopal SEB are useful in this invention. Epoxy resins of the Epon type (e.g. Epon 1004 and Epon 1007) may also be mentioned as exemplary water-insoluble resins which are useful in this invention. Of particular interest are the water-insoluble resins derived from rosin such as Lewisol 28 (maleic modified rosin) and Ester Gum 8L (glycerol ester of rosin).

Basic dyes useful informing in situ water-insoluble dye salts are those basic dyes which are chemically stable at 60° C. and very light fast. In addition, the basic dyes should be soluble in the solvents of this invention; particularly glycols and glycol ethers which are the preferred solvents. Such basic dyes are well known in the art and therefore no detailed enumeration thereof will be given herein. However, in the interest of clarity there is mentioned below basic dyes which are useful in this invention such as Du Pont Victoria Blue B Base (C. I. Solvent Blue 4). Du Pont Victoria Pure Blue BO (C. I. Basic Blue 7), and Calcozine Acrylic Turquoise 3 G (C. I. Basic Blue 3). The basic dyes may also be in the form of their acid salt. The acid salt of the basic dye may be formed in situ in a solution by separate addition of a basic dye and an acid such as a mineral acid or carboxylic acid. In the alternative, the acid salt of the basic dye may be formed prior to the addition thereof to the solution. A preferred mineral acid would be hydrochloric acid. Carboxylic acids which are preferred in the present invention are aliphatic acids such as fatty acids, e.g. oleic acid. However, aromatic acids such as gallic acid or tannic acid may also be utilized.

Any solvent can be utilized in my invention if it is a mutual solvent for all of the dyes and the water-insoluble resin. In addition to the foregoing property the solvents utilized in this invention should also have a relatively low vapor pressure to avoid evaporation of the solvent from the ink when exposed to atmospheric conditions, i.e. when the ink is on the ball. If this occurs the ball "freezes" in the socket and for all practical purposes the ballpoint pen can no longer be utilized. Preferably the solvent utilized in the present invention is a mixture of solvents, a low boiling solvent (e.g. having a boiling point range of 160°–200° C.) and a high boiling solvent (e.g. having a boiling point range of 230°–275° C.).

The reason for utilizing a low boiling solvent is to reduce ink viscosity and to promote rapid drying of ink on paper. Low boiling, low viscosity solvents migrate more rapidly into the paper than do the higher boiling solvents and, therefore, promote rapid drying of ink on paper. Examples of low boiling solvents are lower alkyl glycols such as propylene glycol and ethylene glycol. Also lower alkyl ethers of lower alkylene glycol such as the methyl and ethyl ethers of diethylene glycol are useful low boiling solvents. Further there may be mentioned heterocyclic compounds such as methyl-2-pyrrolidone.

As noted above, there should also be in the ink solution, in addition to the low boiling solvent, a high boiling solvent because high boiling solvents remain in the ink even when exposed to ambient conditions and thus prevent the ink from drying too rapidly and forming a hard crust on the ball. Examples of such high boiling solvents are lower alkylene glycols such as diethylene glycol, dipropylene glycol and triethylene glycol and also higher alkyl glycols such as 2 - ethyl-1,3-hexanediol. In addition, aromatic ethers of lower alkylene glycols such as ethylene glycol monophenyl ether can be utilized to good effect in this invention.

A typical water-fast blue ballpoint pen ink is made as follows utilizing the following components:

| Components: | Amount (pts. by wt.) |
|---|---|
| (1) Resin (Polyol X450)[1] | 20 |
| (2) Solvent | 43 |
|   (a) Diethylene glycol moonethyl ether | 16 |
|   (b) Butylene glycol | 17 |
|   (c) Octylene glycol | 10 |
| (3) Acid (oleic acid) | 5 |
| (4) Sulfonate acid dye [2] | 21 |
| (5) Acid salt of basic dye (Victoria Pure Blue BO·HCL)[3] | 6 |
| (6) Basic dye | 5 |
|   (a) Victoria Blue Base [4] | 3 |
|   (b) Methyl Violet Base [5] | 2 |

[1] Poly X 450 is a copolymer of styrene and allyl alcohol having a molecular weight of about 1,150 and an average equivalent weight of 222.
[2] The sulfonated acid dye is "LAXOL" Blue MBSN which is a sulfonated phthalocyanine dye which has been reacted with di-ortho toluol guanidine.
[3] Victoria Pure Blue BO·HCL is a water-soluble tri-phenyl methane dye having a C.I. Number of 42595.
[4] Victoria Blue B Base is solvent blue 4; C.I. Number 44045B.
[5] Methyl Violet Base has a C.I. Number 42535B.

The resin is dissolved in the solvent and then the acid and all the dyes are added. The mixture is then heated and stirred until the dyes dissolve and react (about 1 to 2 hours at 90–100° C.).

The thus produced ink solution has no solid particles and no particles precipitate even after the ink has stood for a long period of time under ambient conditions. The physical properties of the ink are as follows:

Viscosity 15,000–18,000 centipoises pH 6–6.5
Surface tension 34–35 dynes/centimeter.

It will be understood that the foregoing description is only illustrative of the present invention and it is not intended that the invention be limited thereto. Many other specific embodiments of the present invention will be apparent to one skilled in the art from the foregoing disclosure. All substitutions, alterations and modifications of the present invention which come within the scope of the following claims are to which the present invention is readily susceptible without departing from the spirit and scope of this disclosure are considered a part of the present invention.

We claim:
1. A water-fast ink for ballpoint pens which consists essentially of:
  (1) from 15 to 25% by weight of a water-insoluble copolymer of styrene and allyl alcohol in solution in from 35% to 60% by weight of a solvent mixture consisting essentially of diethylene glycol monoethyl ether, butylene glycol, and octylene glycol; and
  (2) from 20% to 50% by weight of a water-insoluble dye which is the reaction product of a sulfonated acid dye and a member selected from the group consisting of a basic dye, the acid salt of a basic dye and mixtures thereof, the acid salt being derived from a mineral acid or carboxylic acid.

2. A method for producing a water-fast ink for a ballpoint pen which comprises dissolving from 15% to 25% by weight of a water-insoluble copolymer of styrene and allyl alcohol in from 35% to 60% by weight of a solvent mixture consisting essentially of diethylene glycol monoethyl ether, butylene glycol, and octylene glycol; and adding a sulfonic acid dye and a member selected from the group consisting of (1) a basic dye, (2) an acid salt of a basic dye, and (3) heating and stirring the resulting mixture until the sulfonic acid dye, the basic dye and the acid salt of a basic dye dissolve, whereby there is formed an acid dye salt which is water-insoluble.

References Cited

UNITED STATES PATENTS

| 2,623,827 | 12/1952 | Moos | 106—23 |
| 3,425,779 | 2/1969 | Fisher et al. | 106—22X |

FOREIGN PATENTS

| 902,110 | 7/1962 | Great Britain | 106—22 |
| 1,062,321 | 3/1967 | Great Britain | 106—22 |

OTHER REFERENCES

Apps. Inks for the Minor Printing Processes and Specialized Applications, London, Leonard Hill Publishers, 1963, Z 247 A7 V. 3, page 207 relied on.

JULIUS FROME, Primary Examiner

J. B. EVANS, Assistant Examiner

U.S. Cl. X.R.
106—23, 32; 260—33.4, 33.6, 41